(12) United States Patent
Martin et al.

(10) Patent No.: US 6,508,135 B1
(45) Date of Patent: Jan. 21, 2003

(54) LIQUID FLOW METER

(75) Inventors: Barry John Martin, Marsfield (AU); Neil Colin Temperley, Ryde (AU); John Chester Wendoloski, Killara (AU); Graeme Edwards, Berowra (AU); Paul Drew, Ryde (AU); Jason Ivan Vanajek, Lalor Park (AU); Peter Raymond Dencher, Oatlands (AU)

(73) Assignee: Commonwealth Scientific and Industrial Research Organisation, Campbell (AU)

(*) Notice: Subject to any disclaimer, the term of this patent is extended or adjusted under 35 U.S.C. 154(b) by 0 days.

(21) Appl. No.: 09/673,887

(22) PCT Filed: Apr. 23, 1999

(86) PCT No.: PCT/AU99/00309
§ 371 (c)(1),
(2), (4) Date: Mar. 1, 2001

(87) PCT Pub. No.: WO99/56135
PCT Pub. Date: Nov. 4, 1999

(30) Foreign Application Priority Data

Apr. 24, 1998 (AU) ............................................. PP-3180

(51) Int. Cl.[7] ................................................. G01F 1/66
(52) U.S. Cl. .................................................. 73/861.28
(58) Field of Search ......................... 73/861.28, 861.29, 73/861.34, 861.27, 861.22

(56) References Cited

U.S. PATENT DOCUMENTS

| | | | |
|---|---|---|---|
| 4,384,491 A | | 5/1983 | Brown et al. |
| 4,391,150 A | * | 7/1983 | Rey .......................... 73/861.29 |
| 4,856,321 A | * | 8/1989 | Smallings et al. ............ 73/40.5 |
| 5,035,147 A | * | 7/1991 | Woodward ................ 73/861.28 |
| 5,121,658 A | * | 6/1992 | Lew ............................. 73/195 |
| 5,228,347 A | * | 7/1993 | Lowell et al. ............ 73/861.28 |

FOREIGN PATENT DOCUMENTS

| | | |
|---|---|---|
| DE | 2854321 | 6/1979 |
| SU | 679800 | 8/1979 |

* cited by examiner

Primary Examiner—Hezron Williams
Assistant Examiner—Jewel V. Thompson
(74) Attorney, Agent, or Firm—Wood, Phillips, Katz, Clark & Mortimer

(57) ABSTRACT

A liquid flow meter for directly measuring the velocity of a liquid is disclosed. The liquid flow meter includes a pair transducers arranged facing each other in a conduit through which the liquid flows. The liquid flow meter also includes a transmitter means for causing the transducers to simultaneously transmit an acoustic wave packet directed for reception at the other transducer. A differential receiver means is also included whereby the differential receiver means has inputs each coupled to a corresponding one of the transducers for detecting an acoustic signal received thereby and determining a difference between the two received signals. The difference being related to the velocity of the liquid within the conduit. The transmitter means and the differential receiver means are each matched to the transducers to ensure substantial reciprocity to thereby substantially avoid phase and/or amplitude variations in the received signal. A method for measuring the velocity of a liquid is also disclosed. The method involves transmitting an acoustic wave packet between a pair of transducers that face each other, detecting an acoustic signal received by a pair of amplifiers and determining the time difference between the two received signals where the receiver amplifiers are matched to the transducers through resistive components.

19 Claims, 5 Drawing Sheets

LIQUID FLOW METER

FIELD OF THE PRESENT INVENTION

The present invention relates broadly to an electronic liquid flow meter and, in particular to a liquid flow meter for domestic and commercial use.

BACKGROUND TO THE INVENTION

Traditional liquid flow meters in domestic and commercial use generally include some mechanical arrangement such as a bellows, or a vane or impeller which actuates a totalising mechanism. Generally, a mechanical dial arrangement indicates the total volume of liquid that has passed through a meter Such mechanical arrangements are not highly accurate, especially at low flow rates. Accordingly, inaccuracies in low flow rate measurement can represent a substantial loss of income to the supplier of water or other liquids such as hydrocarbons.

Over recent years, there have been a number of proposals that utilise electronics technology so as to provide for substantial higher accuracy of the fluid flow measurement. Such systems generally incorporate ultrasonic transducers that transmit ultrasonic signals both upstream and downstream to measure the times of flight of the signals from which the relative speed of the fluid can be calculated. A further method measures the phase change between two signals which are simultaneously transmitted from the transducers in order to calculate the speed of the fluid.

However, problems arise with the use of ultrasonic signals due to substantial variations in amplitude and phase of the waves transmitted and received by the ultrasonic transducer, resulting in inaccurate measurements. These variations can arise due to changes in temperature, a build-up of material on the transducer heads which affects impedance matching of circuit components, and also ageing and micro-cracking of the transduction elements.

Variations must be allowed for during the design and calibration of transducer circuits with the "reciprocity theorem" being applied to the circuit components. The Chambers Dictionary of Science & Technology (1991) defines the "reciprocity theorem" as "the interchange of electronic force at any one point in a network and the current produced at any other point results in the same current for the same electromotive force". In application to acoustics, the theorem essentially says that a transmitter and a receiver may be swapped to give a reciprocal electro-acoustic transformation Existing arrangements fail to achieve true reciprocity in ultrasonic transducer calibrations. Thus, accurate measurement, particularly at very low flow rates has been unable to be achieved.

It is an object of the present invention to substantially overcome, or ameliorate, one or more of the deficiencies of the above mentioned arrangement by provision of a liquid flow meter that is accurate over a wide range of temperatures and operating conditions.

SUMMARY OF THE INVENTION

According to one aspect of the present invention there is disclosed a liquid flow meter for directly measuring the velocity of a liquid, said liquid flow meter including:
a pair of transducers arranged facing each other in a conduit through which the liquid flows;
transmitter means for causing the transducers to simultaneously transmit an acoustic wave packet directed for reception at the other said transducer;
differential receiver means having inputs each coupled to a corresponding one of said transducers for detecting an acoustic signal received thereby and determining a difference between the two received signals, said difference being related to the velocity of liquid within the conduit, wherein the transmitter means and said differential receiver means are each matched to said transducers to ensure substantial reciprocity to thereby substantially avoid phase and/or amplitude variations in said received signals.

The acoustic wave packet as transmitted preferably comprises a predetermined plurality of cycles.

Preferably the differential receiver means comprises a pair of receiver amplifiers each coupled to a corresponding one of the transducers and outputting the respective inputs of a differential detector. In a specific embodiment the differential detector is formed by a transformer having the terminals of a primary winding coupled to the respective outputs of the receiver amplifiers.

The differential detector preferably outputs a difference waveform, wherein the difference waveform is related to the velocity of the liquid within the conduit.

The liquid flow meter preferably includes a processing means, wherein the processing means removes noise from the difference waveform and calculates the difference between the two received signals.

The processing means farther preferably produces a sinusoidal pulse train at a predetermined frequency which is used to electrically excite the liquid flow meter. Preferably the predetermined frequency is about 1 MHz.

According to another aspect of the present invention there is provided a A method for directly measuring the velocity of a liquid, said method comprising the steps of:
simultaneously transmitting an acoustic wave packet between a pair of transducers arranged facing each other in a conduit through which said liquid flows;
a detecting an acoustic signal received by differential receiver means having inputs each coupled to a corresponding one of said transducers; and
determining a difference between the two received signals, said difference being related to the velocity of liquid within the conduit, wherein the transmitter means and said differential receiver means are each matched to said transducers to ensure substantial reciprocity to thereby substantially avoid phase and/or amplitude variations in said received signals.

BRIEF DESCRIPTION OF DRAWINGS

A number of embodiments of the present invention will now be described with reference to the accompanying drawings in which.

DETAILED DESCRIPTION OF THE DRAWINGS

The preferred embodiment is a liquid flow meter that directly measures the velocity of a liquid by determining the time difference in reception of two separately but simultaneously transmitted bursts of ultrasound in opposite directions in the same tube. Ultrasonic transducers are arranged within respective aerodynamic housings at each end of the tube and can function as either ultrasound emitters or detectors. In the preferred embodiment, the transducers are spaced apart by a distance of 200 mm.

Figure 1:
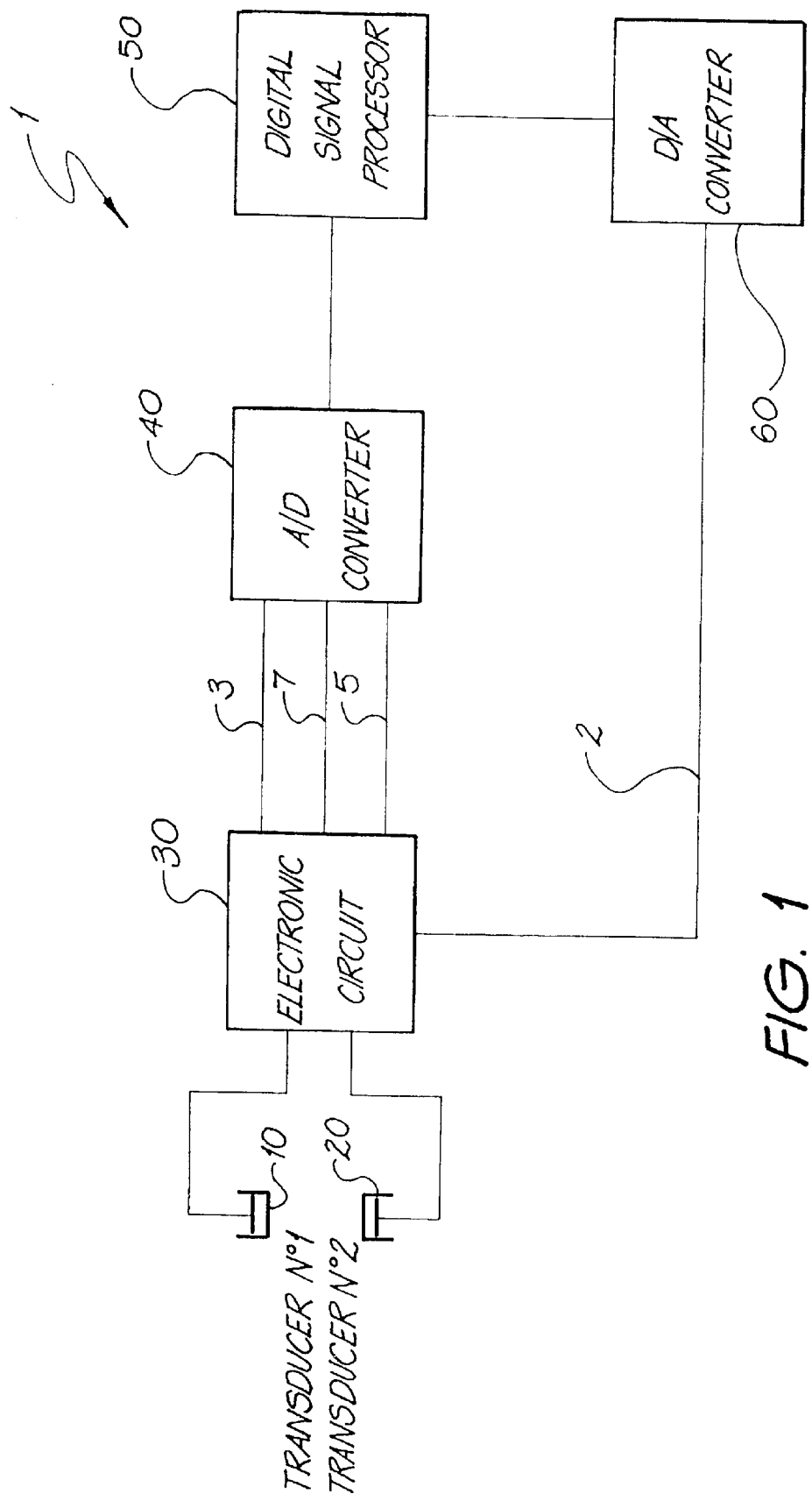
FIG. 1 is a schematic block diagram of the liquid flow meter of the preferred embodiment.

A suitable type of transducer that can be used with the preferred embodiment is a PZT ceramic transducer (manufactured by KB-Aerotech). The electronic liquid flow meter is provided with an electronics circuit which generates, detects and calculates a time difference between the two ultrasonic transducer waves, FIG. 1 shows an overall block diagram of the liquid flow meter 1 of a first embodiment which includes two transducers 10 and 20 which are connected to an electronic circuit 30 which drives the transducers 10 and 20 simultaneously and outputs signals 3, 5 and 7 having amplitudes or phases related to the velocity of the liquid. The output of the electronics circuit 30 is fed into an analogue to digital converter (ADC) 40, for converting the signals 3, 5 and 7 into digital form for processing by a digital signal processor (DSP) 50. The DSP 50 performs a linear least squares fit on the signals 3, 5 and 7 to remove noise therefrom to enable the actual flow rate to be calculated and displayed (not shown but known in the art). The DSP 50 outputs a digital sinusoidal pulse train signal to a digital to analogue converter (DAC) 60 which feeds back into the electronic circuit 30 in order to drive the electronic circuit 30.

Figure 2:
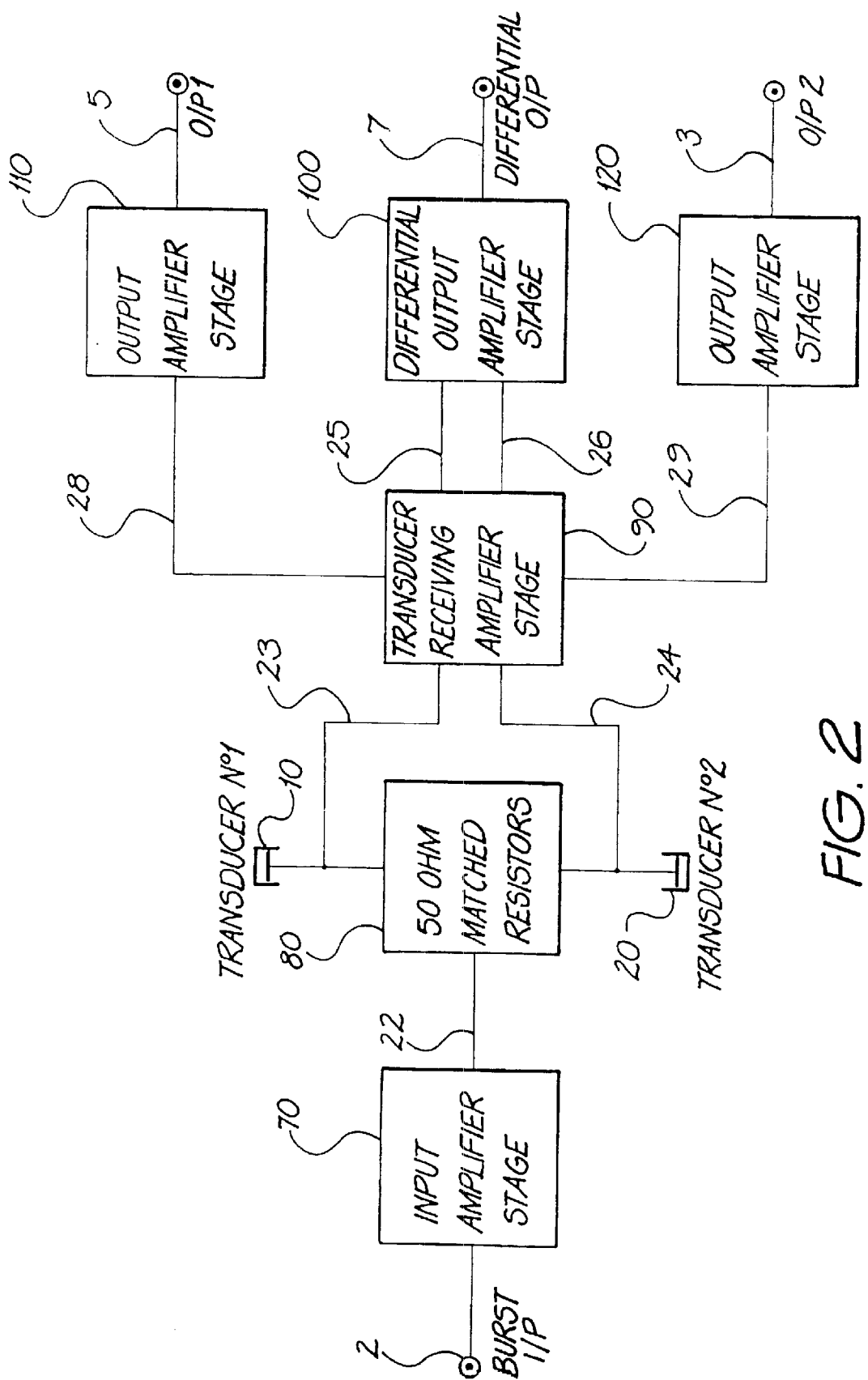
FIG. 2 is a schematic block diagram of the liquid flow meter electronics circuit of FIG. 1.

FIG. 2 shows an overall block diagram of the liquid flow meter electronic circuit 30 of a first embodiment which includes an input amplifier stage 70 connected to a matched resistor stage 80. The two transducers 10 and 20 are also connected to the matched resistor stage 80. A transducer receiving amplifier stage 90 is connected to the two transducers 10 and 20 and feeds into a differential output amplifier stage 100. The transducer receiving amplifier stage 90 is also separately connected to two output amplifier stages 110 and 120.

A sinusoidal pulse train at a preferred frequency of 1 MHz is applied to the burst input 2 of the input amplifier stage 70 for a predetermined period, typically 20 cycles. This preferred number of cycles is long enough to allow the transducer signals to settle at a constant amplitude and yet, short enough so that reverberation between the transducers does not occur. In the preferred embodiment this sinusoidal signal is supplied from the DSP 50 through the DAC 60. The signal is buffered by the input amplifier stage 70 and output simultaneously, via a matched resistor stage 80, to the two ultrasonic transducers 10 and 20. The transducers 10,20, chosen for their stable characteristics, send ultrasonic signals in opposing directions, up and down a moving column of fluid. A time delay will be endured by the signal travelling upstream in comparison to that travelling downstream. Each transducer 10 and 20 is configured to receive the ultrasonic waveform sent by the opposing transducer and convert the respective received waveform into an equivalent electrical waveform. This signal is then fed into and buffered by the transducer receiving amplifier stage 90. The outputs of the transducer receiving amplifier stage 90 feed into the differential output amplifier stage 100, which measures the difference of the two applied waveforms to create a difference signal. The differential output amplifier stage 100 then amplifies the difference signal and buffers to the output. The two further amplifier stages 110 and 120 buffer copies of each of the received signals of the transducers and output the signals so that the raw signal amplitudes can be measured.

Figure 3:
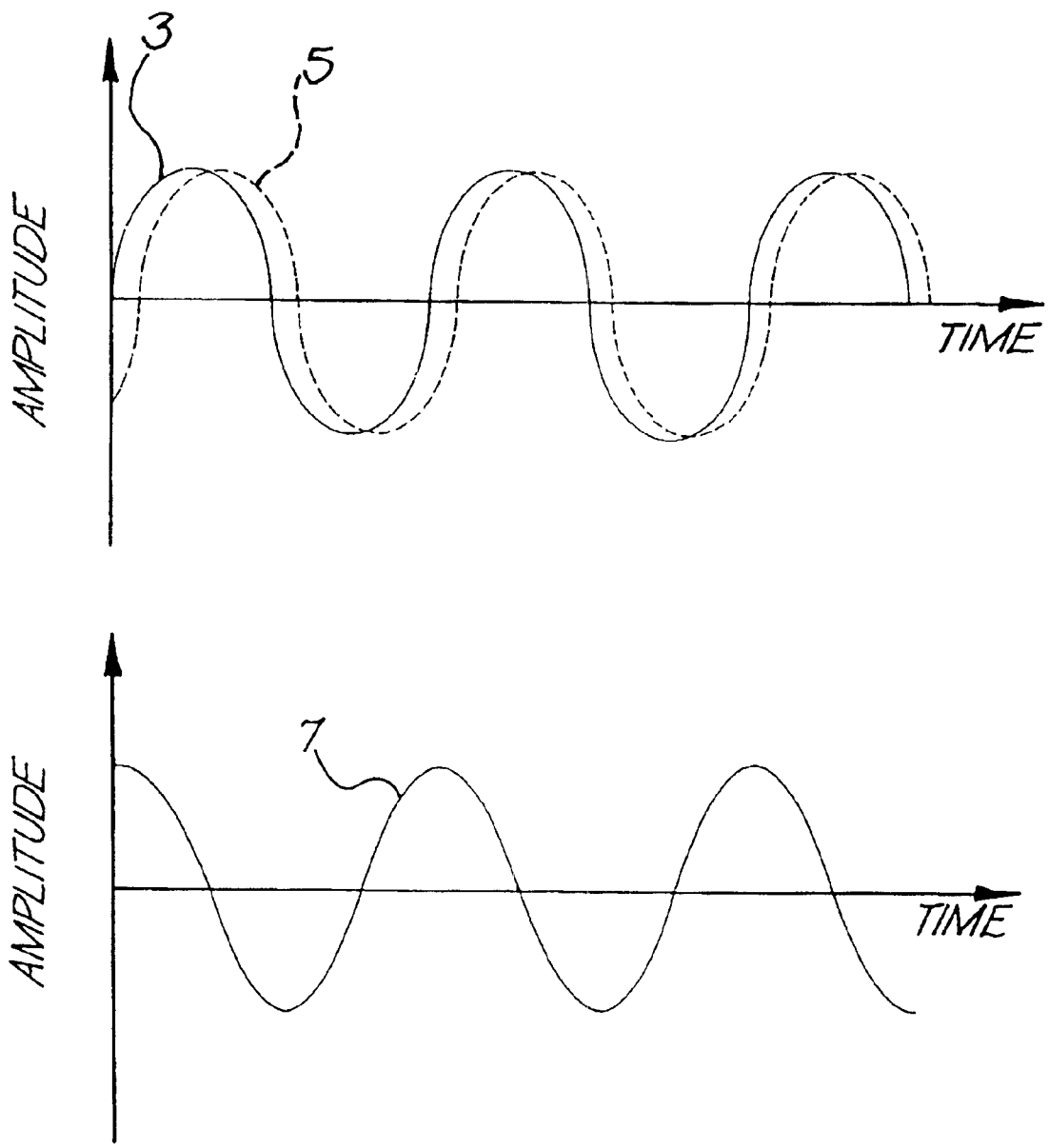
FIG. 3 is a drawing showing the two received transducer waveforms and the resulting differential waveform.

FIG. 3 shows a graph of the transducers received signals. The signal transmitted by transducer 10 is illustrated in FIG. 3 as the downstream signal 3. A time delay can be observed in the upstream signal 5 which was transmitted by transducer 20. The differencing operation of differential output amplifier stage 100 generates a signal 7 which is illustrated in the bottom graph of FIG. 3. The signal 7 has an amplitude that is simply related to the time difference in reception of the simultaneously transmitted downstream signal 3 and upstream signal 5.

Figure 4:
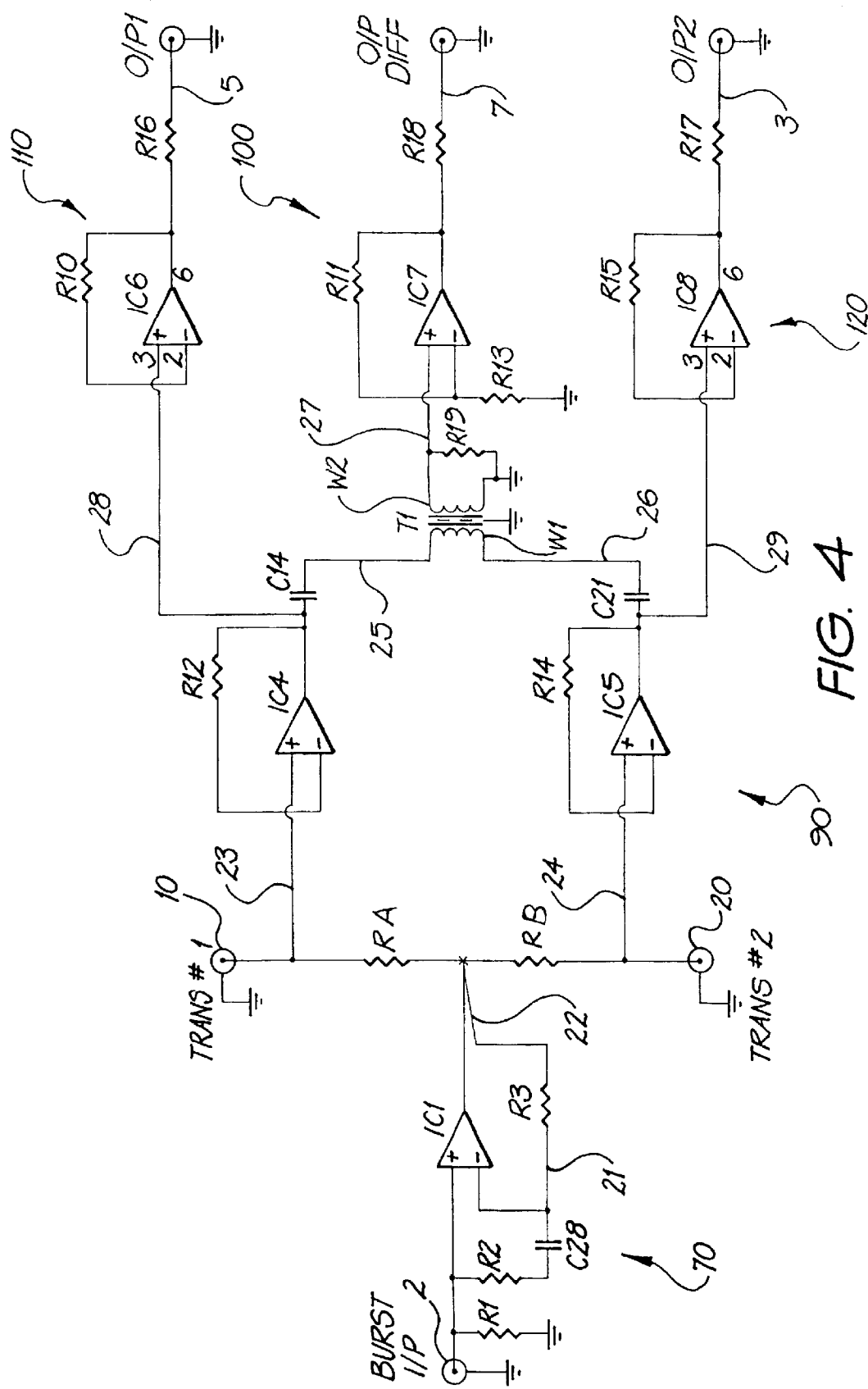
FIG. 4 is a schematic circuit diagram of one implementation of the electronics circuit of FIG. 2.

FIG. 4 shows a circuit diagram of the liquid flow meter electronic circuit 30 of the first embodiment. The input amplifier stage 70 includes an operational amplifier (op amp) IC1 configured in a non-inverting amplifier configuration using negative feedback resistor R3, via lines 21 and 22, and a bootstrapped input, via components R2,C28. Op amp IC1 is preferably chosen and configured to have a high input impedance and a very low output impedance which is in the range of milliohms. The high input impedance effectively decouples the signal input from the circuit. This is supplemented by the bootstrap connection mentioned above. R2 and C28 have a sufficient time constant such that the voltage at the negative input is equal to the voltage at the positive input, and therefore the current through R2 and C28 is nominally equal to zero. The capacitor C28 providing further blocking at lower input frequencies.

The output of the input amplifier stage 70 is simultaneously applied to two matched resistors $R_A$ and $R_B$, to the ultrasonic transducers 10 and 20. The matching of the two resistors is critical so that reciprocity holds.

The two transducers 10 and 20 are connected to two separate receiving amplifiers IC4 (via line 23) and IC5 (via line 24), respectively, which embody the transducer receiving amplifier stage 90.

In the case of transducer 10, upon receiving the transmitted signal from transducer 20, the received signal is converted from an ultrasonic to an electrical signal and applied to op amp IC4. Op amp IC4 is configured as a unity gain voltage follower. The op amp IC4 being chosen to have a high input impedance, a stable response and low noise. The capacitance C14 on the output of IC4 is chosen large enough to act as a short circuit at the preferred frequency. The value of resistance R12 is nominal and does not affect the signal. This circuit is mirrored in the case of transducer 20 for op amp IC5. Both of these amplifiers differentially drive a floating winding W1 of a transformer T1 (via lines 25 and 26), with a secondary winding W2 which provides an input with respect to ground to differential output amplifier stage 100, the latter being formed using an op amp IC7, configured in a non-inverting manner. A resistor R19 is connected across the secondary winding W2 of the transformer T1 and provides a current path for the transformer T1 secondary induced e.m.f. current, thereby providing a voltage signal to the positive input of op amp IC7, via line 27. The secondary winding W2 of transformer T1, thereby registers the difference of the two applied waveforms which were input to either leg of the transformer T1 primary. Therefore, if both applied waveforms are in phase and of the same amplitude, there will be no induced e.m.f. current in the secondary winding W2 of transformer T1 and therefore no voltage input to the op amp IC7.

The difference signal, registered by the transformer T1 secondary is amplified by op amp IC7 and buffered for output through resistor R18. The transformer T1 and op amp IC7 being chosen to have a high common mode rejection ratio so as to reduce any noise associated with the differencing operation of transformer T1.

The two amplifiers IC4 and IC5 which make-up the transducer receiving amplifier stage 90, individually feed into two further separate output amplifier stages 110 and 120. The output of op amp IC4 feeds directly, via line 28, into the positive input of op amp IC6 which is configured as a unity-gain voltage follower. The op amp IC6 buffers the transducer 10 received signal and outputs a copy of the received signal, via resistors R10 and R16. The arrangement of output amplifier stage 110, which includes op amp IC6, is mirrored for output amplifier stage 120 with op amp IC5 feeding directly, via line 29, into op amp IC8. Op amp IC8 is also configured as a unity-gain voltage follower.

The differencing operation of the differential output amplifier stage 100 generates an output signal 7 with an amplitude that is related to the time difference upon reception between the two received transducer signals 3,5. This output signal 7 is measured by an analog-to-digital converter 40, in the preferred embodiment as seen in FIG. 1. In a further embodiment, an oscilloscope may also be used to measure the output. The output is finally sent to a digital signal processor 50. A least-squares fit is carried out on the differential output signal to further reduce the noise in the estimate of its amplitude. This gives a more accurate estimate of the time difference between the two received signals. Once the time difference has been calculated by the computer, the data can be inverted to give an estimate of the fluid flow rate.

Since a change in the amplitude of the received raw transducer signals 3,5 will affect the amplitude of the difference signal as well, any change in the raw signals needs to be counteracted. This is achieved in the preferred embodiment by measuring any changes in the raw signal amplitudes and then dividing the differential output signal by the secondary measured amplitude.

Figure 5:
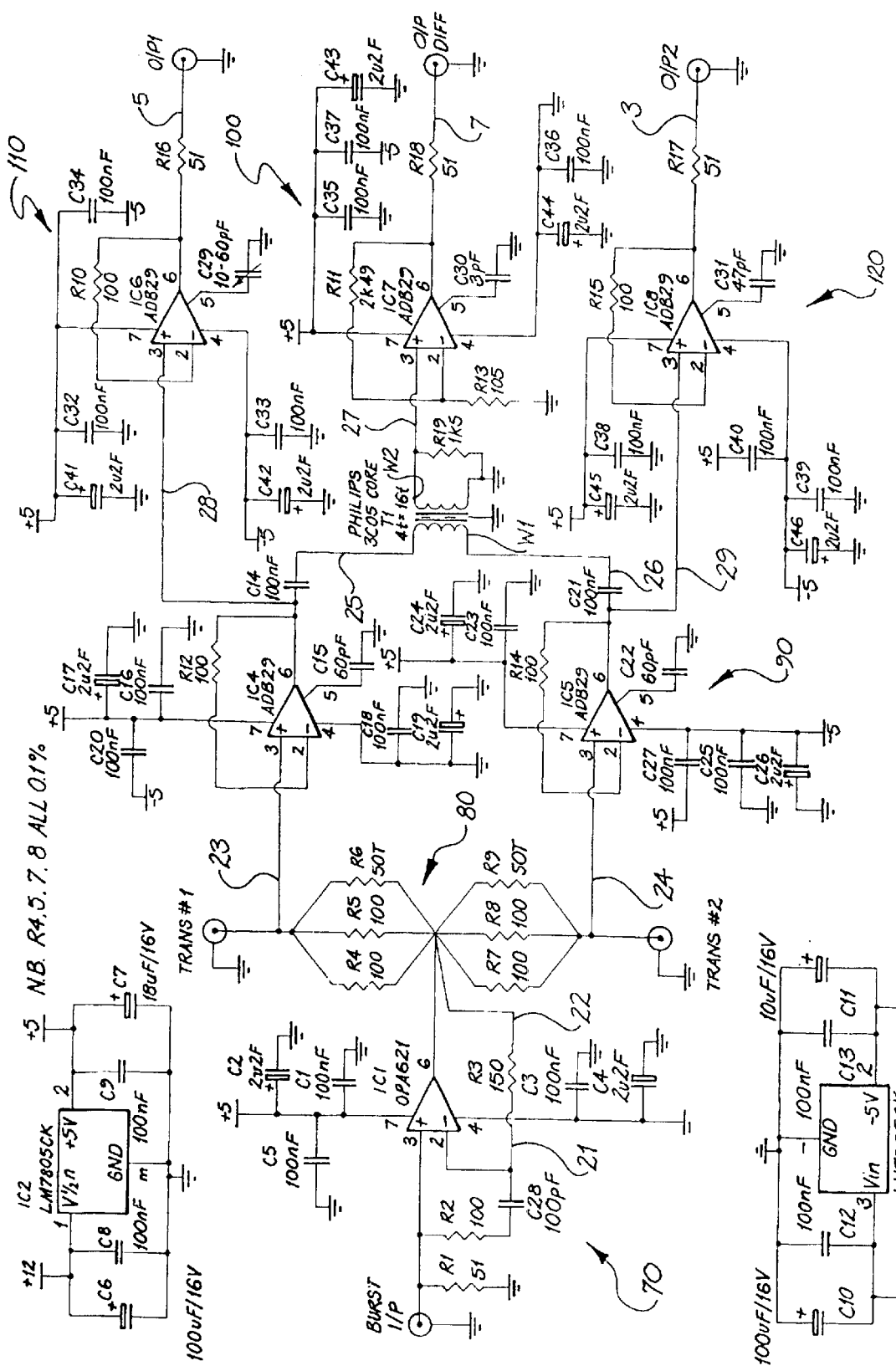
FIG. 5 is a detailed circuit diagram of the electronics circuit of FIG. 4.

FIG. 5 shows a detailed circuit diagram of the liquid flow meter electronic circuit 30 of the first embodiment, which shows all component values and IC numbers. The positive and negative power supply terminals of IC1 are tied to the +5 Vdc and the −5 Vdc regulated power supply rails, respectively. Capacitors C1, C2, C5, C3 and C4 provide filtering and aid in regulating the voltage on the positive and negative supply rails. A similar power supply and filtering arrangement is connected to the other op amps IC4. IC5, IC6, IC7 and IC8. IC1 is an OPA621 chip (manufactured by Precision Monolithics) which has been chosen and configured to have a high input impedance and a very low output impedance. The values of $R_2=100\Omega$ and $C_{28}=100$ pf give a time constant of 100 $\mu$s and therefore the circuit input current is nominally equal to zero.

The output impedance of IC1 is in the milliohm range and therefore the signal seen by the matched resistors $R_A, R_B$ is nominally identical to the input signal with the amplifier providing good current drive.

The matched resistor stage is formed of two 50 ohm matched resistors $R_A$, $R_B$. The resistor $R_A$ is configured as the parallel combination of $R_4=100$ ohms, $R_5=100$ ohms and $R_6$. R6 is adjusted to match the two impedances. Typically a small outlying transistor (50T) or surface mount resistor is used. This arrangement is mirrored in the parallel combination of $R_7=100$ ohms, $R_8=100$ ohms and $R_9$ for resistor $R_B$. The resistors $R_4$, $R_5$, $R_7$ and $R_8$ being chosen to have tolerance values of ±0.1%. Critical matching can be carried out for both parallel combinations through the adjustment of $R_6$ and $R_9$.

Op amp IC4 and IC5 are both AD829 chips (manufactured by Analog Devices) and were chosen to have a high input impedance and good phase and amplitude stability. The high input impedance further improves the matching of the impedance seen by the two transducers 10 and 20, minimises loading of the input driving stage and ensures reciprocity. The phase and amplitude stability ensure that the received signals applied to the transformer T1 primary winding W1 are identical to those seen by the transducers 10 and 20. Capacitor C15 is used for bandwidth compensation. The capacitors C14 and C21 are both equal to 100 nf and will act as a short circuit at the preferred operating frequency of 1 MHz. The resistance $R_{12}=100$ ohms is a nominal value and will not affect the signal. This value of $R_{12}$ is chosen in order to minimise noise and to provide good bandwidth response The power supply configuration, bandwidth compensation and output configuration of IC4 is substantially mirrored for IC5.

Transformer T1 is a Philips 3C85 core transformer and has been chosen for its high CMRR. The transformer has a turns ratio at 4:16 and therefore provides amplification of the difference waveform which is applied to its primary.

Op amp IC7 is an AD829 chip. Resistors $R_{11}=2$ k49 ohms and $R_{13}=105$ ohms provide a gain of approximately 25 for op amp IC7. Op amp IC7 amplifies the difference waveform and buffers it for output thereby decoupling the output stage. Compensation capacitor C30 sets the bandwidth response for op amp IC7 at a predetermined value.

Op amp IC6 and IC8 are also AD829 chips being chosen for their high input impedance and low output impedance characteristic, decouple the circuit from the output and provide good current drive. Compensation capacitor C29 is used to adjust the bandwidth response of operational amplifier IC6. The power supply configuration and bandwidth compensation of IC6 has essentially been mirrored for IC8.

FIG. 5 also shows two voltage regulator circuits which supply the +5 Vdc and −5 Vdc power supply rails for the operational amplifier stages. Voltage regulator IC2 has a +12 Vdc input to provide a +5 Vdc output. Capacitors C6, C8, and C9, C7 provide input and output filtering, respectively, for the voltage regulator IC2 and regulate the output voltage at the desired +5 Vdc level. This circuit is mirrored in the case of the −5 Vdc rail, where voltage regulator IC3 is provided with filtering capacitors C10 to C12.

The above-described embodiment has several advantages which are outlined as follows:

First, due to the very low output impedance of IC1, the very high input impedance of IC4 and IC5, and the critical matching of the two 50 ohm transducer input resistors, true reciprocity is achieved in the preferred embodiment. As a result, the measurements are less susceptible to drift caused by changes in the temperature of the transducers.

Second, the two output amplifier stages 110 and 120 further reduce inaccuracies in the calculated difference signal, by providing the received raw signal amplitudes to be measured. These measurements are then taken into account when calculating the final output difference amplitude and counter-act any discrepancies in the transmitted transducer signal.

The foregoing describes only one embodiment of the present invention, and modifications, obvious to those skilled in the art, can be made thereto without departing from the scope of the present invention.

What is claimed is:

1. A liquid flow meter for directly measuring the velocity of a liquid, said liquid flow meter including:
    a pair of transducers arranged facing each other in a
        conduit through which said liquid flows:

transmitter means coupled to said transducers via resistive components, said transmitter means being configured to cause said transducers to simultaneously transmit an acoustic wave packet directed for reception at the other said transducer; and a pair of receiver amplifiers having inputs each coupled to a corresponding one of said transducers and to a corresponding one of said resistive components, said receiver amplifiers being configured to detect an acoustic signal received by a corresponding one of said transducers and to determine a time difference between the two received signals, said time difference being related to the velocity of liquid within the conduit, wherein the transmitter means and said receiver amplifiers are each matched to said transducers, utilising said resistive components, to ensure substantial reciprocity to thereby substantially avoid phase and/or amplitude variations in said received signals.

2. The liquid flow meter according to claim 1, wherein said acoustic wave packet as transmitted preferably comprises a predetermined plurality of cycles.

3. The liquid flow meter according to claim 1, wherein said receiver amplifiers are configured to output the respective inputs of a differential detector.

4. The liquid flow meter according to claim 3, wherein said differential detector outputs a time difference waveform, wherein said time difference waveform is related to the velocity of the liquid within the conduit.

5. The liquid flow meter according to claim 4, further including a processing means, wherein said processing means removes noise from said difference waveform and calculates a time difference between said two received signals.

6. The liquid flow meter according to claim 5, said processing means further produces a sinusoidal pulse train at a predetermined frequency which is used to electrically excite the liquid flow meter.

7. The liquid flow meter according to claim 6, wherein said predetermined frequency is 1 MHz.

8. The liquid flow meter according to any one of claims 3, wherein said differential detector is formed by a transformer having terminals of a primary winding coupled to respective outputs of said receiver amplifiers.

9. The liquid flow meter according to claim 1, wherein said passive ciruits are impedance matched.

10. The liquid flow meter according to claim 1, wherein said impedances are matched during both emission of said transmit signals and reception of said acoustic signals.

11. A method for measuring the velocity of a liquid, said method comprising the steps of:

simultaneously transmitting an acoustic wave packet between a pair of transducers arranged facing each other in a conduit through which said liquid flows;

detecting a acoustic signal received by each of a pair of receiver amplifiers having corresponding first and second input nodes, each said node being coupled to an output of said transmit amplifier stage via one of a pair of passive circuit, and being further connected to a corresponding one of said; and determining a time difference between the received acoustic signals, said time difference being related to the velocity of said liquid within said conduit, wherein an impedance formed at one said node by an input impedance of a corresponding receiver amplifier and the corresponding one of said passive circuits is matched to the impedance at the other said node formed by The other receiver amplifier and other said passive circuit.

12. The method according to claim 9, further comprising the step of outputting a difference waveform, said difference waveform being related to the velocity of the liquid within the conduit.

13. The method according to claim 12, including the further steps of:

removing noise from said difference waveform; and calculating a time difference between said two received signals, utilising said receiver amplifiers, wherein said receiver amplifiers are configured to output the respective inputs of a differential detector.

14. The method according to claim 9, wherein a sinusoidal pulse rain is produced at a predetermined frequency.

15. The method according to claim 11, wherein said passive circuits are impedance matched.

16. The method according to claim 11, wherein said impedances are matched during both emission of said transmit signals and reception of said acoustic signals.

17. A circuit adapted for use with a liquid flow meter, said circuit comprising:

a transmit amplifier stage having an output;

first and second receive amplifier stages having corresponding first and second input nodes, each said node being connected to said output of said tat amplifier stage via one of a pair of passive circuits so as to cause a transmit signal emitted from the transmit amplifier stage to be passed simultaneously each said node; and a pair of transducers each coupled to one of said nodes, the pairs being configured to convey acoustic signals therebetween upon exitation by said transmit signal, wherein an impedance formed at one said node by an input impedance of said corresponding receive amplifier stage and the corresponding one of said passive circuits is matched to the impedance at the other said node formed by the other receive amplifier stage and other said passive circuit.

18. A circuit according to clam 17, wherein said passive circuits are impedance matched.

19. A circuit according to claim 17, wherein said impedances are matched during both emission of said transmit signals and reception of said acoustic signals.

* * * * *